(12) United States Patent
Searle

(10) Patent No.: US 6,948,490 B2
(45) Date of Patent: Sep. 27, 2005

(54) STEAM GENERATOR

(75) Inventor: Matthew J Searle, Somerset (GB)

(73) Assignee: Thermotic Developments Limited, Somerset (GB)

( * ) Notice: Subject to any disclaimer, the term of this patent is extended or adjusted under 35 U.S.C. 154(b) by 0 days.

(21) Appl. No.: 10/475,726

(22) PCT Filed: Apr. 24, 2002

(86) PCT No.: PCT/GB02/01864

§ 371 (c)(1),
(2), (4) Date: Apr. 1, 2004

(87) PCT Pub. No.: WO02/085171

PCT Pub. Date: Oct. 31, 2002

(65) Prior Publication Data

US 2004/0154614 A1 Aug. 12, 2004

(30) Foreign Application Priority Data

Apr. 24, 2001 (GB) .............................................. 0110050

(51) Int. Cl.$^7$ ............................................... A47J 36/28

(52) U.S. Cl. ............................. 126/263.09; 126/263.05; 126/263.06; 126/263.07; 126/263.08; 126/262

(58) Field of Search ........................ 126/263.01–263.1, 126/261, 262, 202.21, 202.25, 202.26; 128/202.21, 202.25, 202.26; 422/124, 125, 126

(56) References Cited

U.S. PATENT DOCUMENTS

| | | | | |
|---|---|---|---|---|
| 3,561,424 A | * | 2/1971 | Failla | 126/263.09 |
| 4,753,085 A | * | 6/1988 | Labrousse | 62/294 |
| 4,809,673 A | * | 3/1989 | Charvin | 126/263.08 |
| 5,628,304 A | * | 5/1997 | Freiman | 126/263.09 |
| 6,079,405 A | | 6/2000 | Justo | |

FOREIGN PATENT DOCUMENTS

| | | | |
|---|---|---|---|
| EP | 079 286 A | | 5/1983 |
| FR | 790334 | * | 11/1935 |
| FR | 2536979 | * | 6/1984 |
| JP | 01-240472 | * | 9/1989 |
| JP | 01-267178 | * | 10/1989 |
| JP | 02-154716 | * | 6/1990 |
| JP | 02-203820 | * | 8/1990 |
| JP | 03-200573 | * | 9/1991 |
| JP | 03-218715 | * | 9/1991 |
| JP | 04-53561 | * | 2/1992 |
| JP | 04-54922 | * | 2/1992 |
| JP | 04-279117 | * | 10/1992 |
| JP | 08-133348 | * | 5/1996 |
| JP | 08-301364 | * | 11/1996 |
| JP | 09-28265 | * | 2/1997 |
| JP | 09-220045 | * | 8/1997 |
| WO | 87/07491 A | | 12/1987 |
| WO | WO 97/16101 | * | 9/1997 |

OTHER PUBLICATIONS

Patent Abstracts of Japan, vol. 1998, No. 01, Jan. 30, 1998 & JP 09 252951 A, Sep. 30, 1997.
Patent Abstracts of Japan, vol. 1997, No. 05, May 30, 1997 & JP 09 000452 A, Jan. 7, 1997.

* cited by examiner

*Primary Examiner*—Carl D. Price
(74) *Attorney, Agent, or Firm*—Mintz, Levin, Cohn, Ferris, Glovksy and Popeo, P.C.

(57) ABSTRACT

A steam generator device has a first and a second chamber, and walls mutually isolating the two chambers. Reagents which react together to generate steam when in mutual contact are mutually separated by a barrier, and disposed in the first chamber. An opening member forms a first opening between the chambers and a second opening through the barrier. Hence the reagents come into contact via said second opening, the reagents react thereby generating steam, and the steam flows through the first opening into the second chamber.

22 Claims, 5 Drawing Sheets

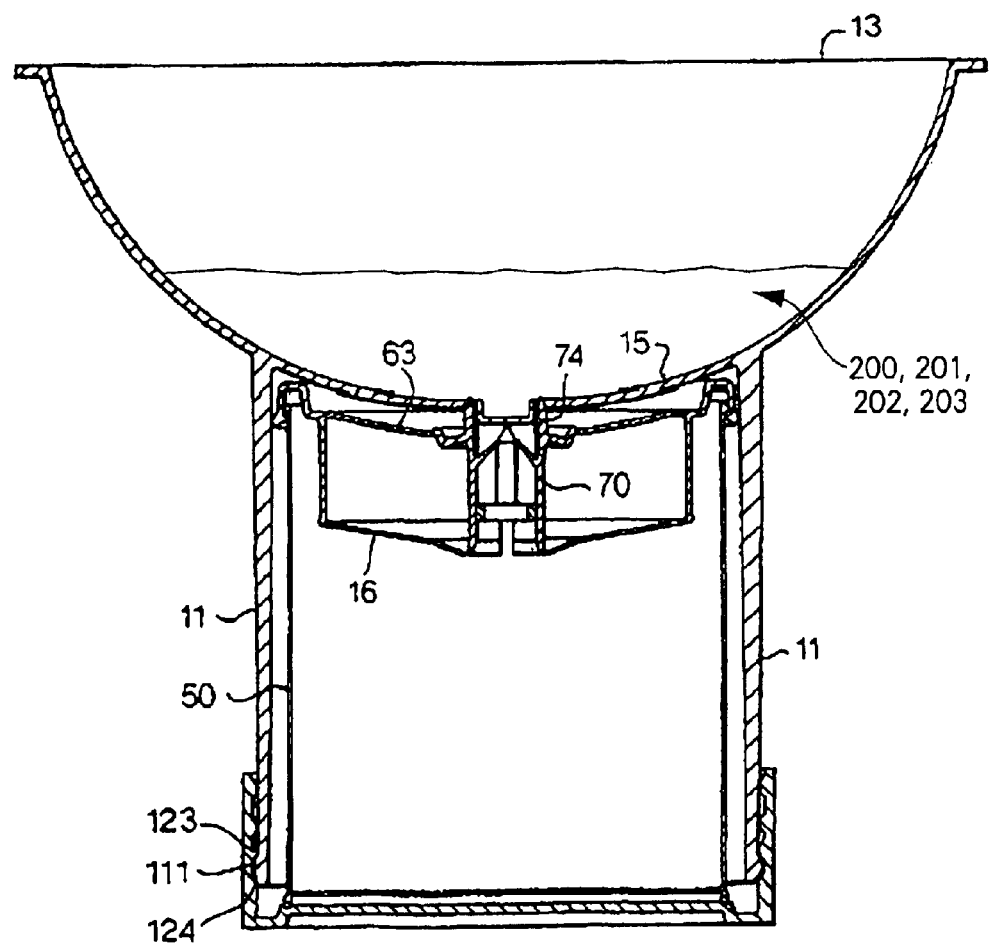

STEAM GENERATOR

This application is the US national phase of international application PCT/GB02/01864 filed 24 Apr. 2002, which designated the US. PCT/GB02/01864 claims priority to GB Application No. 0110050.2, filed 24 Apr. 2001. The entire contents of these applications are incorporated herein by reference.

The present invention relates to a steam generator, and more particularly but not exclusively to a steam generator for heating a substance such as a foodstuff, a beverage or a medicine.

The art includes a number of self-heated food containers in which a material such as quicklime is brought into contact with water to provide an exothermic reaction. The heat resulting from the reaction is typically applied to the outside of a food or beverage container so that the food or beverage is warmed.

Such devices tends to rely on conduction and convection within the food or beverage container and thus are slow in action, while tending to provide uneven heating.

Another known device, shown in U.S. Pat. No. 5,295,475 addresses the problem of uneven temperature by passing the hot vapour arising from the heat-generating reaction through a foodstuff such as rice. To achieve this, the foodstuff is placed on a perforated barrier as filter material while bags containing the two reagents are placed below the filter. A tear strip is used to open the bags and cause the reagents to come together and the resulting vapours passed through the filter to warm the foodstuff.

A problem with this approach is that the foodstuff is not contained within a sealed container. It is desirable for hygiene reasons to maintain a substance such as a foodstuff, a beverage or a therapeutic material in a first container which is hermetically sealed and which has previously been made sterile while the materials that provide the heat, and the containers for those materials, are isolated from the first container, to remove the risk of contamination.

Another application of the present invention is in the production of steam alone, such steam being useful for the reduction of sinus congestion or for cosmetic purposes, and in this application it is also advantageous that the bowl-shaped vessel from which inhalation takes place should be clean.

A further problem with known self-heated food containers is the action of carbon dioxide and water picked up from the atmosphere. Devices, such as the above noted U.S. Pat. No. 5,295,475 have a limited shelf life because of the interaction of the atmosphere with quicklime.

According to a first aspect of the invention there is provided steam generator device comprising walls defining a first and a second chamber, the walls including a wall isolating the first chamber from the second chamber, the first chamber holding a first substance and a second substance, wherein the first and second substances are separated by a barrier, the first and second substances reacting together to generate steam when in mutual contact, the device having an opening member and a support supporting said opening member within said first chamber with respect to said wall, the opening device in use forming a first opening through the said wall, and a second opening through said barrier whereby the first and second substances come into contact via said second opening, said first and second substances react together thereby generating said steam, and the steam flows through said first opening.

The device thus enables the reagents to be disposed in a chamber that is isolated from a further chamber in which a substance may be heated. An opening device causes the two substances to come into contact and forms an opening for passage of the steam. A support enables the opening member to be reliably aligned for its use position.

Preferably the said wall is common to the first and second chambers.

In preferred embodiments, the isolating wall is a common wall. However the two chambers need not have a common wall, provided they are arranged so that in use steam can pass from one to the other after the isolating wall is breached.

Preferably, at least one of the first and second substances is stored in said device prior to use in a hermetically sealed chamber.

Use of a hermetically-sealed chamber enables a long shelf-life for the device.

Preferably the first substance is a fluent substance comprising water, and the second substance comprises quicklime.

The first substance may be water or substantially water for reaction with the quicklime. Alternatively other substances may be mixed with the water of the first substance so as to provide desired effects, such as desired odours. Equally other materials may be mixed with the quicklime, for example to alter its reaction properties.

In other embodiments, the reagent materials need not contain water, but instead the heat produced by the reaction heats water or a mixture containing water so as to produce steam. Examples of other reagents are saline, iron and magnesium or glycerine and potassium permanganate.

Preferably the second container has a portion disposed beneath the first container, whereby said fluent substance containing water can flow through the second opening into said quicklime.

Allowing the water to flow by gravity into the quicklime may be preferable to allowing the quicklime to fall into the water. This is because the flow properties of the water are predictable.

Advantageously the common wall has a zone of reduced thickness for forming said first opening.

Advantageously the zone of reduced thickness describes a substantially closed geometrical shape, and the zone of reduced thickness defines the boundary of a plug portion, and wherein plug portion has an engagement portion for engaging a portion of said device whereby said plug portion is retained in engagement with said portion of said device while said steam flows.

Retaining the plug portion in engagement with a part of the steam-generating device prevents it being consumed where a food or drink is heated by the steam-generating device.

In one embodiment said portion of said device comprises a portion of said common wall.

In another embodiment said portion of said device comprises a portion of said opening member.

Conveniently the closed geometric shape is an annulus.

Preferably the common wall portion has a region including said zone of reduced thickness, said region comprising a first portion surrounding said zone of reduced thickness wherein the first portion has a first thickness, the zone of reduced thickness has a second thickness less than the first thickness, and said plug portion has a third thickness greater than said second thickness.

Advantageously the plug portion comprises a plug member secured integrally to the first portion of first thickness via the zone of reduced thickness, the plug member having a peripheral wall extending substantially perpendicular to the portion of first thickness.

Preferably again the device further comprises a non-return valve for preventing flow of material in the opposite direction to said flow of steam.

The use of a non-return valve ensures that any material in the heated container is available for consumption. If no such non-return valve is provided, some of the material may be lost to the heating container. This may cause undesirable cycling of the reaction.

Preferably again the opening member defines at least part of a conduit for flow of said steam from said first chamber to said second chamber.

Advantageously the opening member has a first cylindrical wall supported upstanding in the first chamber proximate the common wall, the first cylindrical wall having a formation for forming said first opening.

Preferably, the formation comprises the end of said first cylindrical wall.

Advantageously the opening member is supported the spaced from the further wall, is movable to engage the further wall and has an end portion for piercing the further wall thereby forming said second opening.

Conveniently the walls of the first chamber comprise a base wall portion and a side wall portion, wherein the common wall portion is disposed opposing the base wall portion and wherein the common wall portion and base wall portion may be moved relatively towards each other, and wherein the opening member is supported with reference to said base wall portion so that said relative movement causes the common wall portion to engage the opening member to form the first opening.

Advantageously the base wall portion has a foot portion for engaging a surface, and an upstanding first cylindrical wall extending therefrom, wherein the side wall portion comprises a second cylindrical wall, the second cylindrical wall depending from the common wall portion, and wherein the second cylindrical wall telescopically engages the first cylindrical wall.

Conveniently the second cylindrical wall and the first cylindrical wall have co-operating surface formations for maintaining the two walls in at least two different telescopic positions.

Advantageously the surface formations comprise plural spaced parallel ribs on one of said cylindrical walls and a co-operating projection on the other of said cylindrical walls.

Preferably the second container is spaced from the walls defining said first chamber.

Conveniently said common wall portion is concave in said second chamber.

There is also provided an apparatus for heating a substance, the apparatus comprising a steam generator device in accordance with the first or second aspect of the present invention, wherein said substance is disposed in said second chamber such that steam passes through at least some of said substance after flowing through said first opening.

Preferably the common wall extends to form a generally bowl-shaped container for said substance.

In one embodiment said substance comprises a foodstuff.
In another embodiment said substance comprises a soup.
In another embodiment said substance comprises a beverage.
In a further embodiment said substance comprises a therapeutic substance.

According to another aspect of the invention, there is provided method of making a self-heating device for a material, wherein said material is a foodstuff or a beverage, the method comprising:—disposing said material in said container; sealing said container; disposing a first and a second substance outside said container, wherein said first and second substances are mutually separated by a barrier, said first and second substances being selected to react together exothermically when in mutual contact, and wherein one of said substances comprises water; and providing an opening member having a first formation in use forming an opening through a wall of said container and a second formation in use breaching said barrier thereby enabling said first and second substances to come into contact so that they react together to produce steam from said water such that said steam passes through said opening to heat said material in said container.

Preferably said disposing step comprises sterilising said container.

Preferably again, the method comprises providing a module and securing said module to said container, said module including a first container, a second container and said opening member, wherein said first container holds said first substance and said second container holds said second substance.

According to another aspect of the invention there is provided a method of heating a product using a device having a first chamber holding said product and a second chamber holding plural reagents, said second chamber being a closed chamber, said reagents in use generating heat when in mutual contact, and at least one of said reagents being in a closed container disposed in said second chamber; the method comprising: breaching the closed container whereby the reagents come into contact and thereby generate heat; using said heat to evaporate water to produce steam; and creating a passageway for said steam into said first chamber whereby the product is heated directly by said steam.

Exemplary preferred embodiments of the present invention will now be described with reference to the accompanying drawings in which:

FIG. 3 shows a view similar to that of FIG. 1 after forming first and second openings;

In the various figures, like reference numerals refer to like part.

Figure 1:
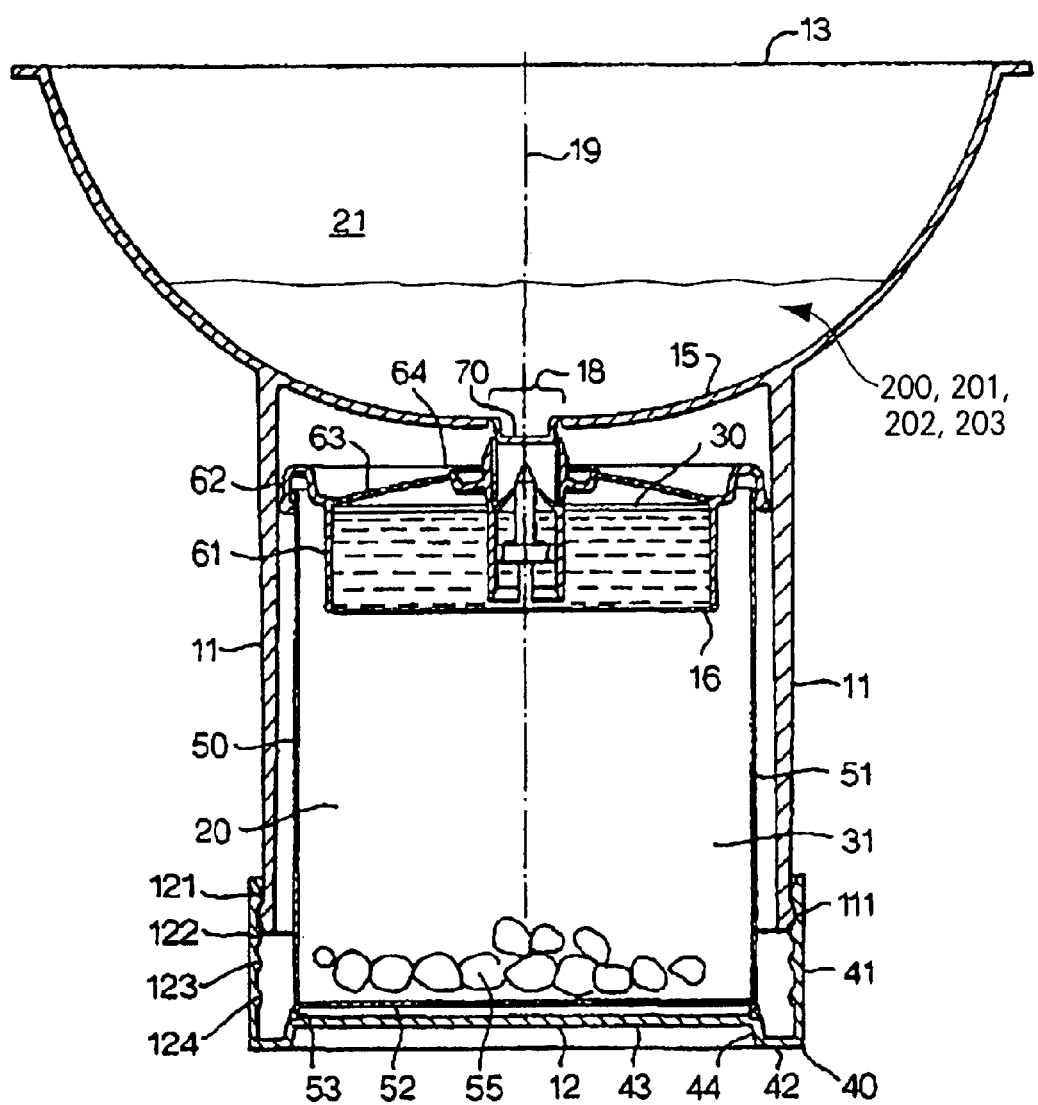
FIG. 1 shows a cross-section through a steam generator in accordance with a first aspect of the present invention.

Referring to FIG. 1, a steam generator device 1 has walls 11, 12, 13 and 15 defining a generally-cylindrical first chamber 20 and a bowl-shaped second chamber 21. The walls include a barrier wall 15 separating the first chamber 20 from the second chamber 21 and common to these chambers. The cylindrical chamber 20 has a side wall 11 and a base wall.

A further wall 16 defines part of a first container 30 disposed in the first chamber 20 into a first container 30. The part of the first chamber below the first container 30 forms a second container 31. The first container 30 holds a fluent substance, here water, and the second container 31 contains quicklime 55. It is clear to those skilled in the art that water and quicklime react together to generate heat and steam.

It will also be clear to those skilled in the art that the first container may contain substances additional to water and that other heat generating reagents than water and quicklime could be substituted. If water is not one of the reagents, then the reaction heat is used to evaporate water to produce steam.

Figure 8:
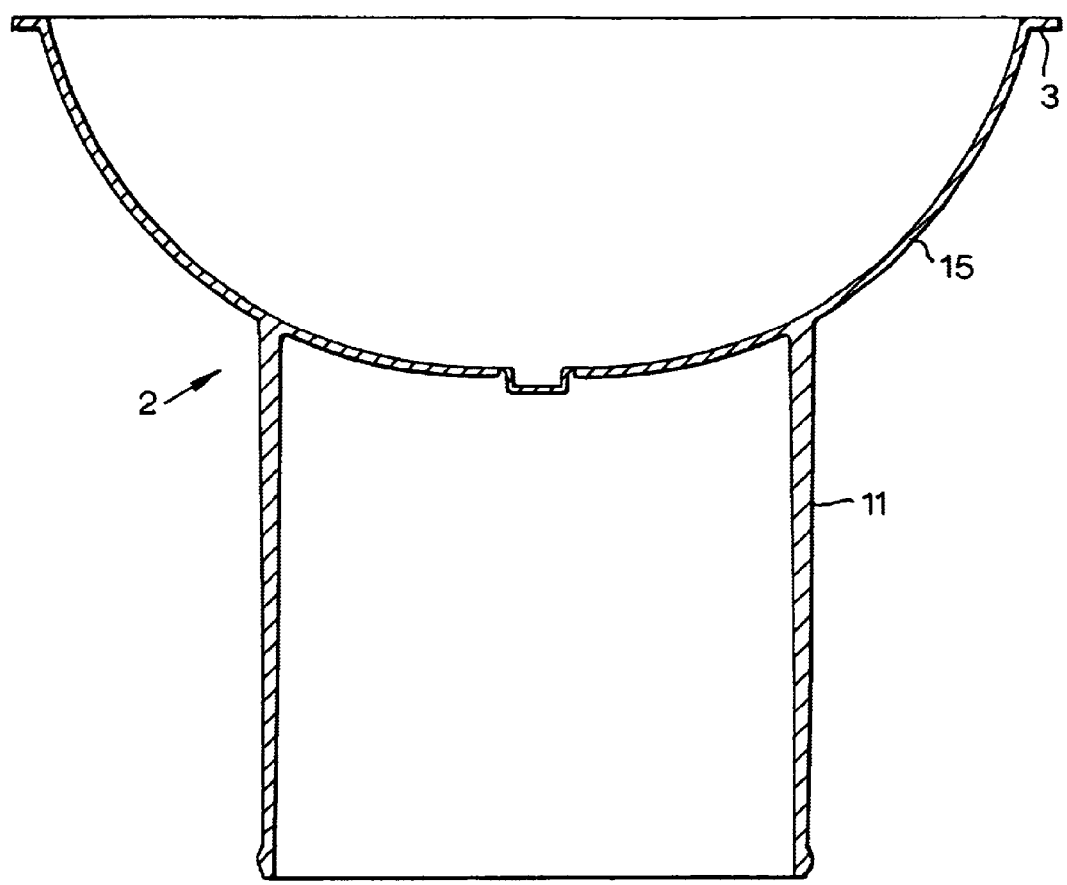
FIG. 8 shows a sectional view through a food container for forming part of the first embodiment.

Continuing to refer to FIG. 1, the barrier wall 15 is bowl-shaped and upwardly-concave and has an associated cover 13 which, together with the wall 15, forms a hermetically sealed container—see also FIG. 8.

A generally cylindrical portion 11 depends from the barrier wall 15 to form a side wall portion of the first chamber 20. A separate base portion 40 has an upstanding generally cylindrical wall portion 41 which has a diameter such as to engage with the side wall 11 in a manner which will be described later herein. The base portion 40 includes base wall 12 which extends across from the bottom of portion 40 and which includes an annular foot portion 42, by means of which the steam generator rests on a surface, and an indented circular portion 43 connected to the annular foot portion 42 via an angled transition region 44.

In the disclosed embodiment, walls 11, 12 and 15 are of plastics and the cover 13 is of a metallised foil material.

Within the first chamber 20 there is disposed a metal container 50 which has a circular-cylindrical side wall 51 and a circular base 52, the two being secured together at a downwardly depending rim 53 which is secured to and engages with the circular portion 43 of the base wall portion 40. The metal container 50 is open at the top, and its side wall 51 forms a support wall supporting the first container 30 above the second container 31.

The first container 30 which is itself hermetically sealed, has additionally to the above-defined further wall 16, a cylindrical side wall portion 61 which extends upwardly from the further wall 16 generally parallel to the side wall 11. At its upper extremity, the side wall portion 61 extends outwardly into a hooked portion 62 which sealingly engages over the upper extremity of the metal container side wall 51. The consequence is that the metal container 50, which contains the quicklime 55, is hermetically sealed once the first container 30 is secured to it. From the upper extremity of the wall 61 a flexible wall 63 extends generally inwardly in an annular fashion to cover the first container 30 over a little more than half of the radius of the first container 30.

At this point the upper wall 63 extends via a circular hinge region 64 into an opening member 70 which will be more fully described with reference to FIG. 2.

Figure 2:
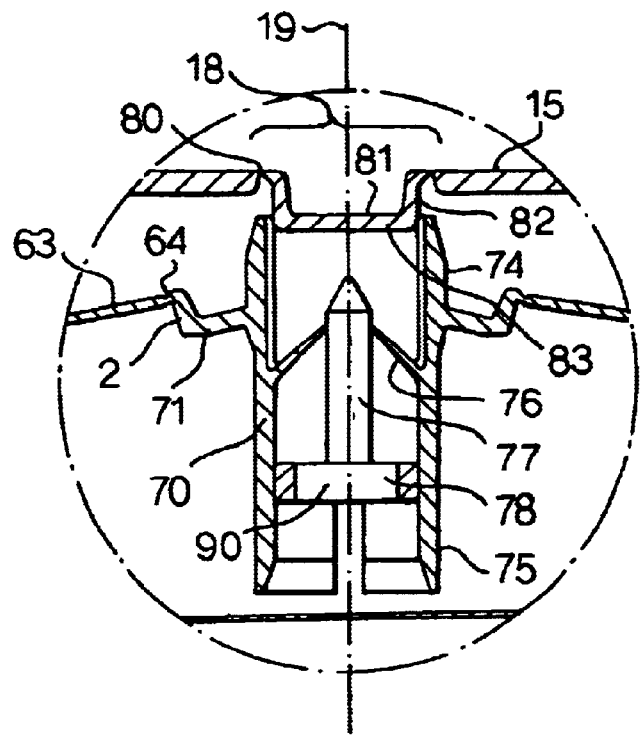
FIG. 2 shows an enlarged view of the opening member of the embodiment of FIG. 1.

Referring to FIG. 2, the opening member has a generally cylindrical wall, open at each end with an outwardly extending annular lip 71 disposed at about four-fifths its height. At an outward extremity of the annular lip 71, there is an upwardly-directed flange portion 72 which extends into the above-described circular hinge region 64.

Referring once again to FIG. 1 it will be seen that the common wall 15, which forms the bowl-shaped container 21 has a generally constant thickness except in a region 18 close to a longitudinal axis 19 of the steam generator device.

Referring now to FIG. 2, it will be seen that the wall 15 extends through the region of constant first thickness into an annular region 80 of greatly reduced thickness. Within the annular region 80 there is an inner region 81 of thickness greater than the reduced thickness but less than the first constant thickness. In the embodiment shown, the inner region 81 is a depressed plug member having a cylindrical peripheral wall portion 82 which is parallel to the longitudinal axis 19 and a plug end wall 83 which is orthogonal to the axis 19. The outer extent of the cylindrical peripheral walls 82 substantially corresponds to the cylindrical spacing defined by the upper cylindrical wall 74 of the opening member 70. The upper cylindrical walls 74 of the opening member 70 has an external form which is tapering inwards towards the upper extremity of the wall.

At the lower extremity 75 of the opening member 70 the inner part of the wall tapers outwards towards the end to provide a reduced surface area at the lower end portion.

Referring again to FIG. 1, It will be seen that the side wall 11 has, at its lower end, an outwardly-directed circular rib 111. It will also be seen that the wall 41 of the base portion has four spaced inwardly-directed ribs 121, 122, 123 and 124. It will be seen in FIG. 1 that the outwardly-directed rib 111 is disposed between the upper two inwardly-directed ribs 121 and 22 so that the spacing between the wall 15 and the base 12 is at its maximum.

The ribs 121–124 are designed to allow inward-telescoping of the device to the position shown in FIG. 3. In this figure it will be seen that the outwardly-directed rib 111 is now disposed between the lower two inwardly-directed ribs 123 and 124. This is best achieved by a user placing the foot portion 42 on a surface and pressing down at the top of the device so as to urge the upper portion, 11, 15 downwardly to the base. Referring to FIG. 3, it will be seen that the action of moving the top part of the steam generator device downwardly has brought the wall 15 into co-operative engagement with the opening member 70. In fact the opening member 70 has been urged downwardly so as to pierce the lower wall 16 of the upper container 30, thus allowing water from the upper container 30 to go down into the second chamber 31 which, it will be recalled, contains quicklime. At the same time, or shortly before the wall 16 is pierced, the upper wall 74 of the opening member separates the plug member 82 from the remainder of the wall 15 at the reduced thickness breakthrough area 80.

Figure 4:
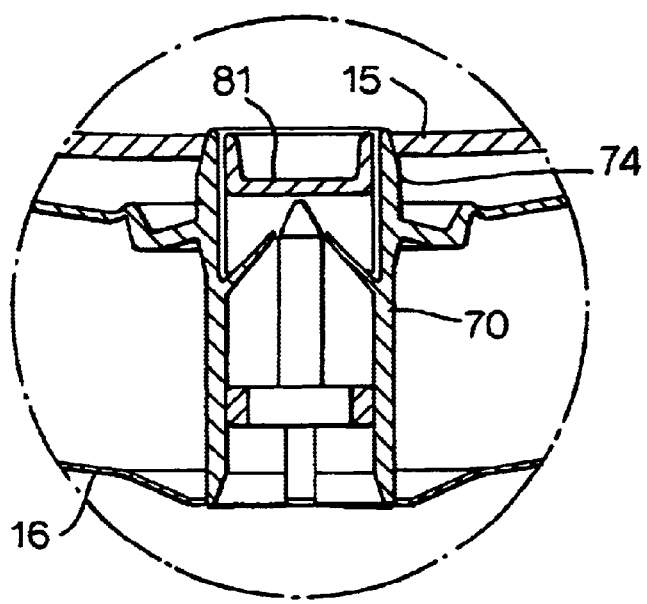
FIG. 4 shows an enlarged view of the opening member after formation of the first and second openings.

Referring to FIG. 4 it will be seen that the inward tapering part of the wall 74 is in tight sealing engagement with the inner edge of the remainder of the wall 15 and that the plug member 81 is engaged with the opening member 70. In this embodiment, the inner part of the upper wall 74 is formed with a series of axis-parallel ribs, similar to splines, so as to engage portions of the outer periphery of the plug member 81. The spaces between the ribs allows for flow through the opening member from the first chamber 20 into the second chamber 21.

Figure 5:
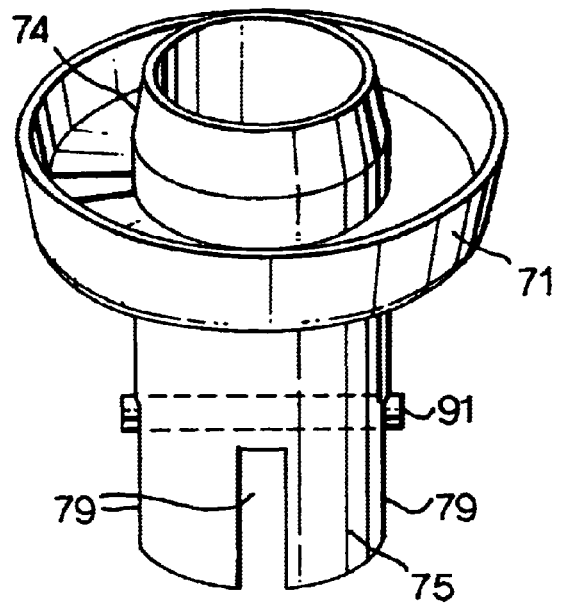
FIG. 5 shows a prospective view of the opening member of FIG. 1.

Returning to FIG. 2, it will further be seen that the opening member 70 has a tongue portion 76 extending inwardly from all around its internal surface. The tongue portion 76 is flexible. It has an inner circular opening which by the resilience of the member 76 is urged into contact with the outer periphery of a circular rod 77 which extends upwardly from a head portion 78 of a valve member 90. As will be seen more clearly in FIG. 5, the lower part of the opening member 75 has longitudinal slots 79 and the head 78 of the valve member 90 has protrusions 91 which engage in the slots 79 to locate the valve member 90.

Referring now to FIG. 3 and FIG. 4, once the water has flowed through the pierced wall 16 into the quicklime in the container 31, a substantial amount of heat is generated. Further water entering the hot area will be turned to steam and will pass up into the opening member 70. Pressure of steam opens the valve formed by the tongue 76 and the valve member 90 and flows through the gaps between the splined portions of the inner wall of the upper part of the plug 74 to enable steam to flow into the upper container 21.

The pathway through the opening member and past the plug member 81 causes water in the liquid state, which may be carrying lime, to be prevented from passing into the bowl-shaped chamber. Instead only steam is allowed to pass.

In other embodiments, a serpentine path formed for example from a set of baffles, may be provided in the steam path so that liquid water is extracted from the steam, for instance caused to fall back into the reaction chamber.

It is assumed that prior to operation the uppermost wall 13 has been removed or perforated to allow the steam to escape.

In one application, the bowl-shaped upper wall is designed for inhalation of steam by a user. In this case, the user places his or her face close to the outlet of the bowl-shaped chamber 21 and inhales steam.

In another application, the upper container 21 contains generally solid food and the steam passing from the lower container through the passageways around the plug heats the food.

In a third application, the chamber 21 contains a soup and this is heated by the passage of steam.

In a fourth application, the upper chamber 21 contains a beverage to be heated by the steam and in a fifth application the chamber 21 contains a therapeutic material such as for example menthol.

It will be appreciated that a fundamental feature of embodiments of the invention in which a liquid is in the upper chamber 21 is the fact that the liquid cannot flow into the lower chamber 20, and thus become contaminated, because of the non returned valve formed by the tongue member 76 and the valve member 90.

Figure 6:
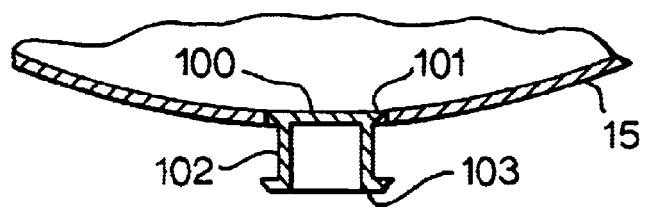
FIG. 6 shows a cross-sectional view through a part of a second embodiment or the invention.

Referring now to FIG. 6, an alternative embodiment the present invention will now be described. It will be seen from FIG. 6 that in place of the recessed plug 81 of FIGS. 1–4, a plug 100 having a generally "top-hat" form is used having an upper face which is generally continuous with the wall 15. The plug 100 has generally cylindrical side walls 102 and at the lower extremity these extend outwardly with a circular flange portion 103. At the upper extremity of the side walls 102, there is a region of greatly reduced thickness 101, which extends to the rest of the wall 15.

Figure 7:
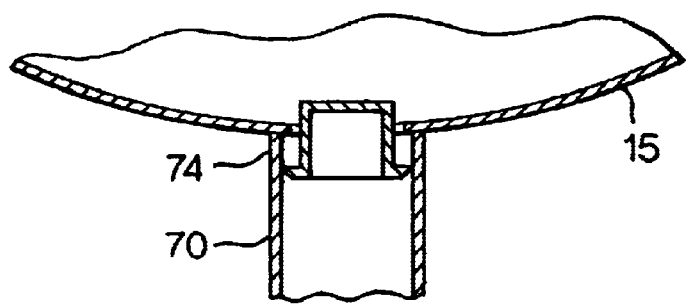
FIG. 7 shows 6a view similar to that of FIG. 6 but with the opening formed.

Referring to FIG. 7, the opening member 70 has a stepped configuration so as to engage with the ends of the flange 103 and urge the plug 100 upwardly so as to the break through the regions of reduced thickness. The uppermost ends of the walls 74 of the opening member 70 engage sealingly with the underside of the wall 15 to prevent the escape of steam.

As previously discussed the invention provides the advantage of mutual isolation between the container for food and the container for the reagents. Preferred embodiments allow for manufacture, filling and sterilisation of a food container prior to installing the reaction materials.

FIG. 8 shows the food container part of the embodiment of FIGS. 1–6. It will be understood by those skilled in the art that the container 2 may be moulded from plastics material and then filled and sterilised in the normal way. Alternatively the food container may be manufactured by moulding and then sterilised before the addition of a sterile product. At some point a sterile cover for example metallised foil 13 of FIG. 1 will be sealed to the outwardly extended rim 3 seen in FIG. 8 so as to maintain the contents of the food container sterile.

It is only then necessary to add the remaining components supported on the base wall portion 40 and including the reaction materials supported by the metal container 50 when the product is to be distributed.

Numerous modifications to the disclosed embodiments are envisaged by the inventor. Firstly, although the first container 30 is shown as containing water, it would be possible to include an additional substance with the water if so desired. Alternatively it would be possible to provide quicklime in the first container 30 with the water being in the second container 31 in which case the quicklime would be released upon piercing of the wall 16.

Alternative reagents include potassium permanganate and glycerine. Other reagents will be known to the skilled man, for example saline iron and magnesium.

In the described embodiment, the opening member is supported by the first container 30. It would also be possible to form an upwardly projecting member from the base of the device which would serve to pierce the wall 16 when the upper part of the device is moved downwardly and then to support a similar opening member to that shown in FIG. 1 to cause it to breakthrough the container wall 15.

It would also be possible to have a suitably formed projection from the base of the device which could serve both the pierce the wall 16 and to break through the container wall 15. It is, however, desirable that such an opening member have means for retaining any broken out portion of the wall 15 to prevent its accidental ingestion. It will be understood by those skilled in the art that the retention feature is provided by the first and second embodiments described above.

It would be possible in another embodiment to have the water-containing enclosure disposed beside the quicklime so that once the water container were breached, the water would come into contact with the quicklime by horizontal flow.

The above-disclosed embodiments have at least a part of the non-return valve integral with the body of the opening member. It would be clear to those skilled in the art that the non returned valve could instead be an insert for the opening member or a separate feature.

The above-described embodiments require pressure to be exerted downwardly on the device to urge the upper container closer to the support base. It would be clear to those skilled in the art that the same effect could be achieved by other means, for example by a screw thread.

In the example illustrated, the chambers are separated by a common wall. It would alternatively be possible to provide a third chamber intermediate the first and second chambers so there is no common wall, and use the operating member to breach both walls in sequence. It would also be possible to use the opening member only to breach one wall, with steam pressure expelling a plug in the other wall. The important feature is that before use the reaction chamber is separated from the chamber to be heated, and in use steam from the reaction enters the chamber to be heated.

An embodiment of the present invention has been described with particular reference to the example illustrated. However, it will be appreciated that variations and modifications may be made to the example described within the scope of the present invention.

What is claimed is:

1. A steam generator device comprising:
   walls defining a first and a second chamber, said walls including a barrier wall isolating the first chamber from the second chamber, the first chamber holding a first substance and a second substance, wherein the first and second substances are separated by a wall, the first and second substances reacting together when in mutual contact to generate heat and, by means of said heat, steam;

the steam generator device having an opening device for forming a first opening through said barrier wall and a second opening through said wall, wherein said opening device is supported and aligned with respect to a use position thereof and comprises a portion for piercing said wall, said portion being supported in said first chamber and being moveable to engage and pierce said wall to said second opening therethrough;

whereby the first and second substances come into contact via said second opening; said first and second substances react together to generate heat and, by means of said heat, steam; and the steam flows through said first opening;

said steam generating device further comprising a valve for preventing flow of material in a direction opposite to said flow of steam.

2. A steam generator device according to claim 1 wherein said barrier wall is common to the first and second chambers.

3. A steam generator device according to claim 1, wherein at least one of the first and second substances is stored in said device prior to use in a hermetically sealed chamber.

4. A steam generator device according to claim 1, wherein the first substance is a fluent substance comprising water, and the second substance comprises quicklime.

5. A steam generator device according to claim 4, comprising a first container and a second container, the first container holding the first substance and the second container holding the second substance, wherein the second container has a portion disposed beneath the first container, whereby said first substance can flow through the second opening into said quicklime.

6. A steam generator device according to claim 5, wherein the second container is spaced from the walls defining said first chamber.

7. A steam generator device according to claim 1, wherein the heat of reaction of the first and second substances evaporates water to generate steam.

8. A steam generator device according to claim 1, wherein said barrier wall has a zone of reduced thickness for forming said first opening which describes a substantially closed geometrical shape to define the boundary of a plug portion, and wherein the plug portion has an engagement portion for engaging a portion of said steam generator device whereby said plug portion is retained in engagement with said portion of said steam generator device while said steam flows.

9. A steam generator device according to claim 8, wherein said portion of said steam generator device comprises a portion of said barrier wall.

10. A steam generator device according to claim 9, wherein said barrier wall has a first portion of a first thickness, and the plug portion comprises a plug member secured integrally to the first portion of first thickness via said zone of reduced thickness, the plug member having a peripheral wall extending substantially perpendicular to the first portion of first thickness.

11. A steam generator device according to claim 1, wherein said opening device defines at least part of a conduit for flow of said steam from said first chamber to said second chamber.

12. A steam generator device according to claim 1, wherein the walls of said first chamber comprise a base wall portion and a side wall portion, wherein a common wall portion of said barrier wall is disposed opposing the base wall portion and wherein the common wall portion and base wall portion may be moved relatively towards each other, and wherein the opening device is supported with reference to said base wall portion so that said relative movement causes said barrier wall to engage the opening device to form said first opening.

13. A steam generator device according to claim 12, wherein the base wall portion has a foot portion for engaging a surface, and an upstanding first cylindrical wall extending therefrom, wherein the side wall portion comprises a second cylindrical wall, the second cylindrical wall depending from the common wall portion, and wherein the second cylindrical wall telescopically engages the first cylindrical wall.

14. A steam generator device according to claim 13, wherein the second cylindrical wall and the first cylindrical wall have co-operating surface formations for maintaining the two walls in at least two different telescopic positions.

15. A steam generator device according to claim 14, wherein the surface formations comprise plural spaced parallel ribs on one of said cylindrical walls and a co-operating projection on the other of said cylindrical walls.

16. A steam generator device according to claim 12, wherein said barrier wall is concave in said second chamber.

17. Apparatus for heating a substance, the apparatus comprising a steam generator device according to claim 1, wherein said substance is disposed in said second chamber such that steam passes through at least some of said substance after flowing through said first opening.

18. Apparatus according to claim 17, wherein said barrier wall extends to form a generally bowl-shaped container for said substance.

19. Apparatus according to claim 17, wherein said substance comprises a foodstuff.

20. Apparatus according to claim 17, wherein said substance comprises a soup.

21. Apparatus according to claim 17, wherein said substance comprises a beverage.

22. Apparatus according to claim 17, wherein said substance comprises a therapeutic substance.

* * * * *